E. J. LINDSEY.
STEERING ARM.
APPLICATION FILED MAR. 19, 1915.
1,218,424.
Patented Mar. 6, 1917.
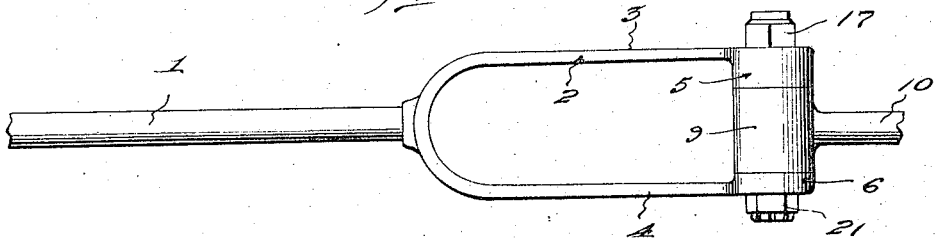
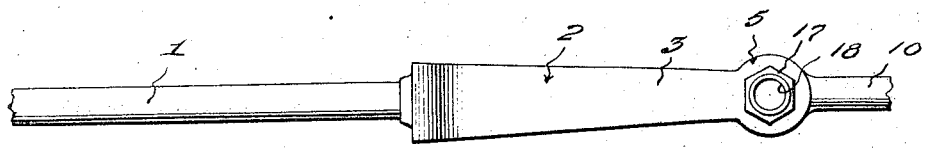
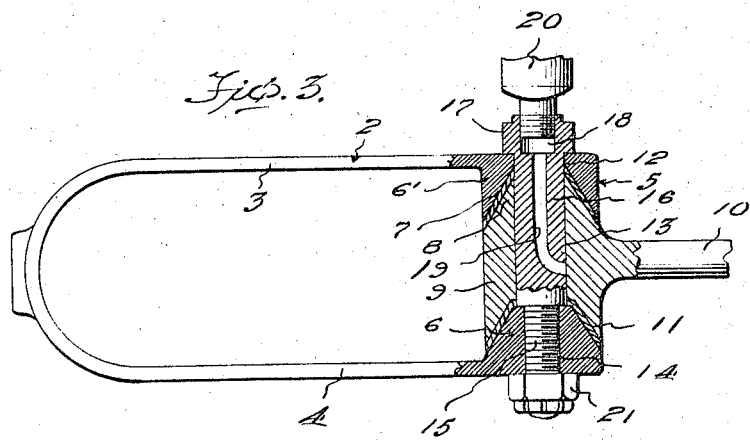
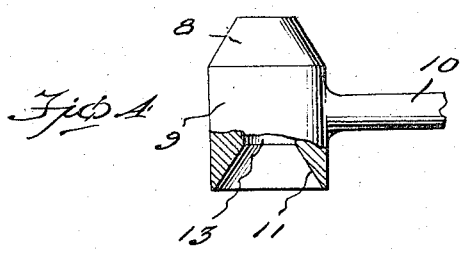
Inventor
E. J. Lindsey

UNITED STATES PATENT OFFICE.

EARL J. LINDSEY, OF SOMERSET, INDIANA.

STEERING-ARM.

1,218,424.

Specification of Letters Patent. Patented Mar. 6, 1917.

Application filed March 19, 1915. Serial No. 15,554.

*To all whom it may concern:*

Be it known that I, EARL J. LINDSEY, a citizen of the United States, residing at Somerset, in the county of Wabash and State of Indiana, have invented certain new and useful Improvements in Steering-Arms; and I do hereby declare the following to be a full, clear, and exact description of the invention, such as will enable others skilled in the art to which it appertains to make and use the same.

This invention relates to improvements in steering arms for use upon motor vehicles, and more particularly to connections between the cross rod yokes and the steering arms.

The primary object of this invention is to provide a novel form of coupling or connection between the cross rod yokes and the steering arms of the steering mechanism of a motor vehicle, which will permit of free articulation of the various parts, and which will act automatically for taking up or compensating for the wear occasioned between the steering arm coupling and the cross rod yokes.

Another object of this invention is to provide a yoke for connection to the cross rods of the steering mechanism of a motor vehicle, and the steering arm, which is constructed of spring or resilient metal and which has a conical bearing boss and a conical bearing seat formed upon the ends of the arms of the yoke for receiving the coupling carried by a steering arm.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved yoke and steering arm and coupling, Fig. 2 is a top plan view of the cross rod yoke and steering arm, Fig. 3 is a cross sectional view through the connection of the steering arm coupling and the bearing ends of the yoke, and Fig. 4 is a fragmentary view partially in section of the steering arm coupling.

Referring more particularly to the drawings, 1 designates the cross rod of the steering mechanism of a motor vehicle, which has yokes 2 connected to its ends. The yokes 2 may be connected to the cross rod 1 in any suitable manner, such as by welding, screw threading connection, or any other connection found practical in the construction of the device.

The yoke 2 is constructed of spring or resilient material, preferably steel, and the arms 3 and 4 thereof have bearings 5 and 6 formed upon the inner surfaces at their outer ends.

The bearing 5, which is formed upon the inner surface of the outer end of arm 3, is composed of a boss 6', which is provided with a conical seat 7, which conical seat is provided for receiving the conically shaped end of the coupling head 9 of the steering arm 10.

The bearing 6, which is formed upon the inner surface of the outer end of the arm 4, is a substantially frusto-conically shaped boss, which is provided for seating in the conical seat 11 formed in the end of the coupling head 9, opposite to the end upon which the conical bearing 8 is formed.

The coupling head 9 and the bearings 5 and 6 are provided with alining openings or bores 12, 13 and 14 formed in the bearing boss 5, the coupling head 9 and the bearing boss 6 respectively. The opening 14 which is formed in the bearing boss 6 is internally screw threaded, for receiving the externally screw threaded reduced end 15 of the cross rod pin 16. The cross rod pin 16 has a head 17 formed upon its end opposite to the reduced end 15, which head is provided with an internally screw threaded recess 18 which is in communication with a lubricating duct 19 which extends longitudinally through a part of the length of the main body of the pin 16 and curves outwardly, communicating with the outer surface of the pin, for permitting the passage of lubricant therethrough and into the bore 13, in the coupling head 9, in which the pin is mounted.

The recess 18 has its upper end externally screw threaded, for the detachable connection of a grease cup, indicated at 20, thereto, to provide the necessary lubricant for passing through the duct 19.

A nut 21 is mounted upon the externally screw threaded reduced end 15 of the pin 16, and engages the outer surface of the arm 4 for preventing accidental movement of the pin with respect to the yoke 2 and the coupling head 9. The arms 3 and 4, are resilient, and are formed so that they will naturally spring inwardly, forming a snug fitting bearing between the bearing ends of the coupling head 9 and the bearings formed upon the inner surfaces of the outer end of the arm.

From the foregoing description taken in connection with the accompanying drawings the advantages of construction and of the method of operation of the improved steering arm will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A device of the character described comprising a cross rod and a steering arm of a steering mechanism, a substantially U-shaped resilient yoke secured to the cross rod, one of the arms of the yoke having a bearing formed on the inner surface of the outer end thereof and having a conical-shaped opening, the other arm of the yoke having a frusto-conical shaped bearing formed on the inner surface of the outer end thereof and having a screw-threaded opening therein, said steering arm having a head formed thereon and having a conical seat to receive the frusto conical-shaped bearing and having an opening, said head having a frusto conical-shaped end formed thereon and received by the conical-shaped opening, a pin extending through the head and bearing and having one of its ends reduced and screw-threaded within the conical-shaped bearing of the yoke, a nut on said pin, said pin having an opening in its outer end and extending through the pin on the side thereof and a grease cup threaded into the opening in the upper end of the pin for lubricating the bearing and head.

In testimony whereof I affix my signature in presence of two witnesses.

EARL J. LINDSEY.

Witnesses:
LILA MALSBURY,
J. F. JONES.